US012722291B2

(12) United States Patent
Hamaya et al.

(10) Patent No.: US 12,722,291 B2
(45) Date of Patent: Sep. 1, 2026

(54) CONTROL DEVICE, CONTROL METHOD, AND CONTROL PROGRAM

(71) Applicant: OMRON CORPORATION, Kyoto (JP)

(72) Inventors: Masashi Hamaya, Tokyo (JP); Atsushi Hashimoto, Tokyo (JP); Kazutoshi Tanaka, Tokyo (JP); Reina Ishikawa, Tokyo (JP)

(73) Assignee: OMRON Corporation, Kyoto (JP)

( * ) Notice: Subject to any disclaimer, the term of this patent is extended or adjusted under 35 U.S.C. 154(b) by 31 days.

(21) Appl. No.: 18/842,388

(22) PCT Filed: Feb. 16, 2023

(86) PCT No.: PCT/JP2023/005572
§ 371 (c)(1),
(2) Date: Aug. 28, 2024

(87) PCT Pub. No.: WO2023/167003
PCT Pub. Date: Sep. 7, 2023

(65) Prior Publication Data

US 2025/0170710 A1 May 29, 2025

(30) Foreign Application Priority Data

Mar. 2, 2022 (JP) ................................ 2022-032176

(51) Int. Cl.
*B25J 13/08* (2006.01)
*B25J 9/16* (2006.01)

(52) U.S. Cl.
CPC ............ *B25J 9/1633* (2013.01); *B25J 9/161* (2013.01); *B25J 9/1612* (2013.01); *B25J 9/163* (2013.01); *B25J 13/082* (2013.01); *B25J 13/084* (2013.01)

(58) Field of Classification Search
CPC ........ B25J 9/1633; B25J 9/161; B25J 9/1612; B25J 9/163; B25J 13/082; B25J 13/084; G05B 2219/39505; G05B 2219/39532
(Continued)

(56) References Cited

U.S. PATENT DOCUMENTS

2013/0184870 A1* 7/2013 Ota ........................ B25J 9/1669
700/262
2018/0236660 A1 8/2018 Shimodaira
(Continued)

FOREIGN PATENT DOCUMENTS

JP 2019-188587 A 10/2019
JP 2021-084210 A 6/2021
(Continued)

OTHER PUBLICATIONS

CN114097427; Polymerization type sphere like single fruit picking manipulator and controlmethod; Henan Science and Technology Univ. (Year: 2022).*

(Continued)

*Primary Examiner* — B M M Hannan
(74) *Attorney, Agent, or Firm* — Morgan, Lewis & Bockius LLP

(57) ABSTRACT

The present disclosure provides a control device connected to a robot including an end effector acting on a target object, a drive source for driving the end effector or a robot body,
(Continued)

and a tactile sensor provided to the end effector, and that controls the drive source to perform an action on the target object.

19 Claims, 15 Drawing Sheets

(58) Field of Classification Search
USPC .......................................................... 700/260
See application file for complete search history.

(56) References Cited

U.S. PATENT DOCUMENTS

2019/0263001 A1 8/2019 Koike et al.
2019/0321984 A1 10/2019 Yamazaki
2021/0122039 A1 4/2021 Su et al.
2021/0252721 A1* 8/2021 Alspach ............... B25J 15/0033
2023/0026266 A1* 1/2023 Kuehner ................... G01L 1/24
2023/0103759 A1* 4/2023 Beaulieu ................... G01L 1/14
73/862.541
2023/0399136 A1* 12/2023 Budu ..................... B25J 9/0084
2024/0033906 A1 2/2024 Su et al.

FOREIGN PATENT DOCUMENTS

WO 2018/092254 A1 5/2018
WO 2021/080730 A1 4/2021

OTHER PUBLICATIONS

CN110170994; Touch servo control method used for mechanical hand grabbing task; Univ Tsinghua. (Year: 2019).*
International Search Report and Written Opinion dated Apr. 11, 2023, for corresponding International Patent Application No. PCT/JP2023/005572.
Ishikawa et al., “Learning by Breaking: Food Fracture Anticipation for Robotic Food Manipulation”, IEEE Access, vol. 10, 2022, pp. 99321-99329.
Extended European Search Report issued in corresponding European Patent Application No. 23763262.5, dated Jan. 22, 2026.

* cited by examiner

GR
GRIPPER
S(S1,S2)
TACTILE SENSOR
21
MOTOR DRIVE SECTION
M
MOTOR
30
CONTROL DEVICE
31
ACQUISITION UNIT
32
STORAGE UNIT
33
TRAINING UNIT
34
PREDICTION UNIT
40
PREDICTION MODEL
35
CONTROL UNIT 40
41
OUTPUT LAYER
MIDDLE LAYER (HIDDEN LAYER)
INPUT LAYER
ENCODING PROCESSING
DECODING PROCESSING
COMPRESSED DATA
Enc
Enc
Enc
Dec
Dec
Dec
Out
In
In
In
In
$x_{tn-w}$
...
$x_{tn}$
$x_{tn}$
$x_{tn+1}$
$x_{tn+2}$
$x_{t\delta}$, $y_{t\delta}$

FIG. 15

OUTPUT LAYER

MIDDLE LAYER (HIDDEN LAYER)

INPUT LAYER

40

42

CONTROL DEVICE, CONTROL METHOD, AND CONTROL PROGRAM

TECHNICAL FIELD

The present disclosure relates to a control device, a control method, and a control program.

BACKGROUND ART

There is technology capable of gripping a target object using a gripper provided to a robot by controlling a gripping force according to the target object.

For example, Japanese Patent Application Laid-Open (JP-A) No. 2019-188587 discloses a robot control device that, for gripping a soft target object, acquires a surface area of the target object from image data obtained by imaging the target object, and by supplying air pressure according to the acquired surface area, controls a gripper so as to bend according to the air pressure, and changes a separation between griping portions of the gripper, or gripping force of the gripper.

However, robots for gripping target objects may be configured specially according to particular target objects, such as by performing control of gripping force for gripping a soft target object or by being provided with special grippers to grip a soft target object.

Moreover, when performing control of gripping force according to the target object the softness characteristics of a target object may be different even though the target object is the same (for example, depending on the degree of ripeness of a vegetable, fruit, or the like).

This means that it has not been possible to grip various fragile objects without specialized soft grippers and without causing damage.

SUMMARY OF INVENTION

Technical Problem

The present disclosure provides a control device, a control method, and a control program that are capable of gripping various fragile objects without specialized soft grippers and without causing damage.

Solution to Problem

A control device of a first aspect is connected to a robot including an end effector acting on a target object, a drive source for driving the end effector or a robot body, and a tactile sensor provided to the end effector, and controls the drive source to perform an action on the target object. The control device includes an acquisition unit that acquires, by using the tactile sensor, a contact force received from the target object at each of a predetermined time period, a prediction unit that includes a model for predicting, for an input contact force, whether or not a specific effect occurs on the target object at a specific time, and that predicts a time when the specific effect occurs on the target object by inputting the contact force acquired by the acquisition unit to the model, and a control unit that controls the drive source according to a prediction result predicted by the prediction unit.

A control device of a second aspect is the control device according to the first aspect, wherein acquire an action result indicating a result of the contact force obtained when the specific effect occurred on the target object, and the control device further includes a training unit that uses the acquired action result to execute machine learning on the model for predicting a time when the specific effect occurs.

A control device of a third aspect is the control device according to the second aspect, wherein the training unit detects a time series feature of the contact force from the action result, and trains the model to learn a time of a time series feature when a first condition has been satisfied from out of the detected time series feature, as a time when the specific effect occurred on the target object.

A control device of a fourth aspect is the control device according to the third aspect, wherein the time series feature when the first condition has been satisfied is a time series feature detected first most after the contact force exceeded a threshold.

A control device according to a fifth aspect is the control device according to any one of the first aspect to the fourth aspect, wherein the model uses the input contact force to predict a time series feature of the contact force and a predicted contact force at the specific time, and predicts that the specific effect occurs at the specific time in a case in which the specific time related to the predicted contact force corresponds to a time of the time series feature of the contact force.

A control device according to a sixth aspect is the control device according to the fifth aspect, wherein the model sets a range from a time of the time series feature of the contact force as a datum point, and predicts that the specific effect occurs in a case in which the specific time related to the predicted contact force falls within in the range.

A control device according to a seventh aspect is the control device according to the sixth aspect, wherein acquire a feature value indicating a feature of the target object, and the model sets the range according to the acquired feature value.

A control device according to an eighth aspect is the control device according to any one of the first aspect to the seventh aspect, wherein plural of the tactile sensors are provided to the end effector, and the acquisition unit uses the respective tactile sensors to acquire plural contact forces.

A control device according to a ninth aspect is the control device according to the eighth aspect, wherein the model predicts respective time series features of the contact force from each of the plural contact forces, and from out of the predicted time series features of the contact forces, uses a time series feature that has satisfied a second condition to predict a time when the specific effect occurs.

A control device according to a tenth aspect is the control device according to the ninth aspect, wherein the time series feature that has satisfied the second condition is a time series feature detected first most after the contact force exceeded a threshold.

A control device according to an eleventh aspect is the control device according to any one of the first aspect to the tenth aspect, wherein the control unit stops driving the drive source in a case in which the specific effect has been predicted to occur at the specific time.

A control method according to a twelfth aspect is a control method for a control device that is connected to a robot including an end effector acting on a target object, a drive source for driving the end effector or a robot body, and a tactile sensor provided to the end effector, and that controls the drive source to perform an action on the target object. The control method includes acquiring, by using the tactile sensor, a contact force received from the target object at each of a predetermined time period, preparing a model for predicting, for an input contact force, whether or not a specific effect occurs on the target object at a specific time, and predicting a time when the specific effect occurs on the target object by inputting the acquired contact force to the model, and controlling the drive source according to a prediction result as predicted.

A control program according to a thirteenth aspect is a control program for a control device that is connected to a robot including an end effector acting on a target object, a drive source for driving the end effector or a robot body, and a tactile sensor provided to the end effector, and that controls the drive source to perform an action on the target object. The control program causes a computer to execute a processing that includes acquiring, by using the tactile sensor, a contact force received from the target object at each of a predetermined time period, preparing a model for predicting, for an input contact force, whether or not a specific effect occurs on the target objects at a specific time, and predicting a time when the specific effect occurs on the target object by inputting the acquired contact force to the model, and controlling the drive source according to a prediction result as predicted.

Effects of Invention

The present disclosure enables gripping of various fragile objects without a specialized soft gripper and without causing damage.

BRIEF DESCRIPTION OF DRAWINGS

FIG. 15 is a schematic diagram illustrating an example of an RNN according to a seventh exemplary embodiment.

DESCRIPTION OF EMBODIMENTS

Figure 1:
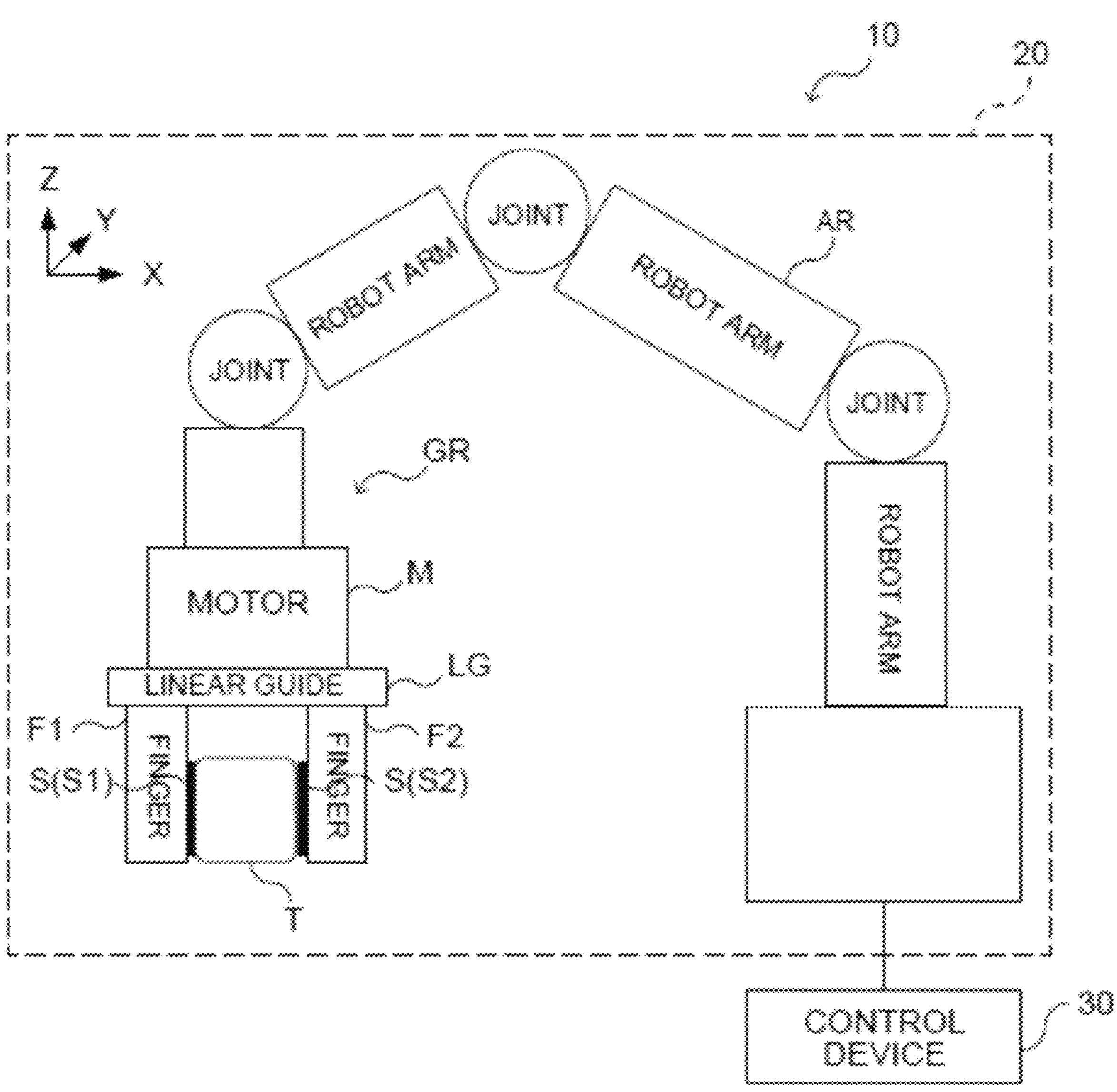
FIG. 1 is a configuration diagram of a robot system according to a first exemplary embodiment.

Description follows regarding examples of exemplary embodiments of the present disclosure, with reference to the drawings. Note that the same reference numerals will be appended to the same or equivalent configuration elements and parts in each of the drawings. Moreover, for ease of explanation, the dimensional ratios in the drawings may be exaggerated, and may differ from actual ratios.

First Exemplary Embodiment

FIG. 1 is a configuration diagram of a robot system 10 according to a first exemplary embodiment. As illustrated in FIG. 1, the robot system 10 includes a robot 20, and a control device 30. In the present exemplary embodiment, the robot system 10 functions as a picking device for picking a target T.

The robot 20 includes a robot arm AR, and a gripper GR attached to a distal end of the robot arm AR, which are functional sections that are the targets of motion control when performing a picking action.

The gripper GR includes two fingers, fingers F1 and F2, for gripping the target T, serving as an example of a target object. Note that although explanation in the present exemplary embodiment is of a case in which the number of fingers is two, the number of fingers is not limited to being two, and three or more fingers may be provided. Moreover, although the fingers F1, F2 are configured as plate shaped members as an example in the present exemplary embodiment, the shape of the finger F1 and the finger F2 is not limited thereto.

Moreover, the gripper GR includes a motor M to drive at least one finger of the finger F1 or the finger F2 as a drive finger. The motor M is connected to a linear guide LG. The linear guide LG includes a conversion mechanism to convert rotational motion of the motor M into linear motion. The gripper GR, the finger F1, and the finger F2 are an example of an "end effector".

The finger F1 and the finger F2 are attached to the linear guide LG. The linear guide LG is driven by the motor M, and converts rotational motion of the motor M having a rotation axis along an Z axis into a linear motion along an X axis direction.

Specifically, for example in cases in which the motor M is rotated in a forward direction, the linear guide LG drives the finger F1 and the finger F2 in a closing direction, namely in a direction to grip the target T. On the other hand, when the motor M is rotated in the reverse direction, the linear guide LG drives the finger F1 and the finger F2 in an opening direction, namely in a direction to release the target T. Note that although in the present exemplary embodiment explanation is given for an example of a configuration in which the finger F1 and the finger F2 are both driven at the same time when the motor M is rotated, a configuration may be adopted in which only one finger of the finger F1 or the finger F2 is driven. Namely, although in the present exemplary embodiment explanation is given of cases in which the drive fingers are both of the finger F1 and the finger F2, the drive finger may be only one of the finger F1 or the finger F2.

Figure 2:
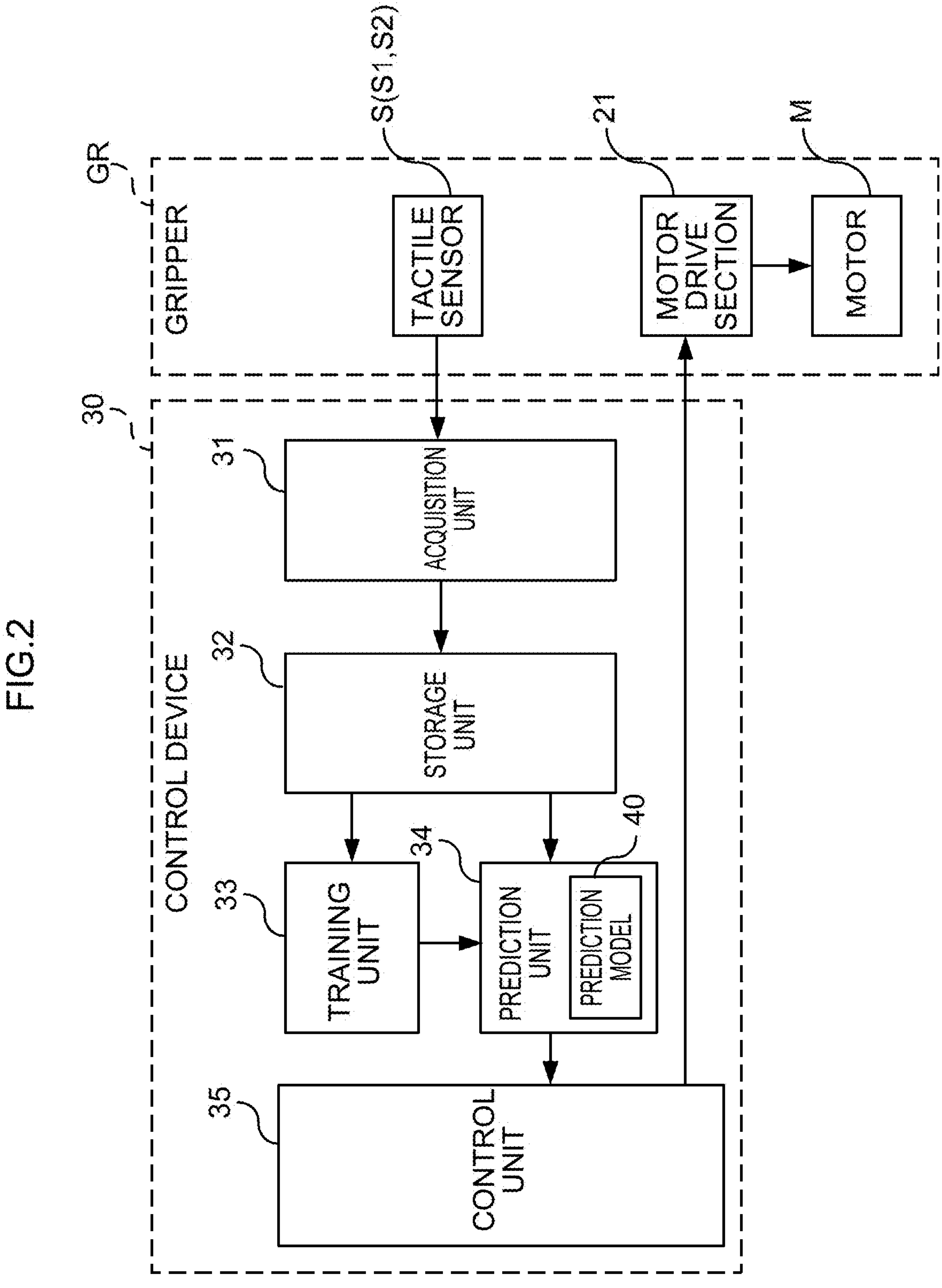
FIG. 2 is a functional block diagram of a robot system according to each exemplary embodiment.

Moreover, the gripper GR includes a motor drive section 21 to drive the motor M (see FIG. 2). The motor drive section 21 drives the motor M at a uniform speed until an instruction to stop is received from a control section 35, described later.

A tactile sensor S1 and a tactile sensor S2 are respectively provided to gripping surfaces of the finger F1 and the finger F2. The tactile sensor S1 and the tactile sensor S2 detect contact forces the tactile sensor S1 and the tactile sensor S2 receive from the target T when the target T has been gripped by the finger F1 and the finger F2.

Note that the tactile sensors S according to the present exemplary embodiment will be described for an embodiment in which they are distributed tactile sensors. However, there is no limitation thereto. The tactile sensors S may each be a single point tactile sensor. Moreover, in the present exemplary embodiment, a configuration will be described for a case configured by the tactile sensors S provided to both the finger F1 and the finger F2, namely, a case in which both the finger F1 and the finger F2 are tactile fingers. However, there is no limitation thereto. A configuration may be adopted in which just one of the finger F1 or the finger F2 is provided with a tactile sensor S.

The contact force referred to here is a reaction force to the gripping force, and has the same magnitude and opposite direction to the gripping force. The gripping force is a force imparted to the target T by the drive finger or the tactile finger. Note that in the present exemplary embodiment, in cases in which the finger F1 and the finger F2 directly contact each other without gripping a target T and force is imparted from one finger to the other, the force imparted to the other finger is called a gripping force. Moreover, although the gripping force is generated for each of the finger F1 and the finger F2, the gripping forces of the finger F1 and the finger F2 are taken as being of the same magnitude and opposite direction to each other, with the influence of gravity not considered.

The robot 20 employed is, as an example, a vertical articulated robot, horizontal articulated robot, or the like having six degrees of freedom, however the number of degrees of freedom and type of robot are not limited thereto.

The control device 30 controls the robot 20. As in an example illustrated in FIG. 2, the control device 30 includes, from a functional perspective, an acquisition unit 31, a storage unit 32, a training unit 33, a prediction unit 34, and a control unit 35. The prediction unit 34 also includes a prediction model 40 that has been subjected to machine learning for predicting a time when damage occurs.

The acquisition unit 31 employs the tactile sensor S1 and the tactile sensor S2 to acquire, at each of predetermined time periods, the contact force received from the target T.

The storage unit 32 stores, as detection results, the contact forces acquired by the acquisition unit 31 for each respective operation (work) of the robot 20. Note that the detection results according to the present exemplary embodiment are time series data of contact forces obtained when the target T has been damaged, such as broken or deformed, by the gripper GR. The detection results referred to here are an example of an "action result", and damage to the target T, such as breaking or deforming, is an example of a "specific effect".

In a training phase, the training unit 33 uses the detection results stored in the storage unit 32 to generate the prediction model 40 that has been subjected to machine learning for predicting a time when damage occurs. Specifically, the training unit 33 generates the prediction model 40 by detecting a time series feature in the detection results and learning the times when the time series feature occurs. Note that the time series feature according to the present exemplary embodiment is a peak value detected first most after damage to the target T occurs and the contact force has exceeded a specific threshold. In the present exemplary embodiment, plural detection results are able to be acquired by using plural tactile sensors S. Moreover, the distributed tactile sensors are able to detect plural contact forces in a single time of operation. Namely, the training unit 33 is able to execute machine learning using plural detection results acquired in a single operation.

For example, the training unit 33 executes the machine learning, using plural contact forces in a specific time period as input data, and using contact force at $\delta$ seconds after the specific time period and peak values of contact force on the target T as training data, to generate the prediction model 40.

Figure 3:
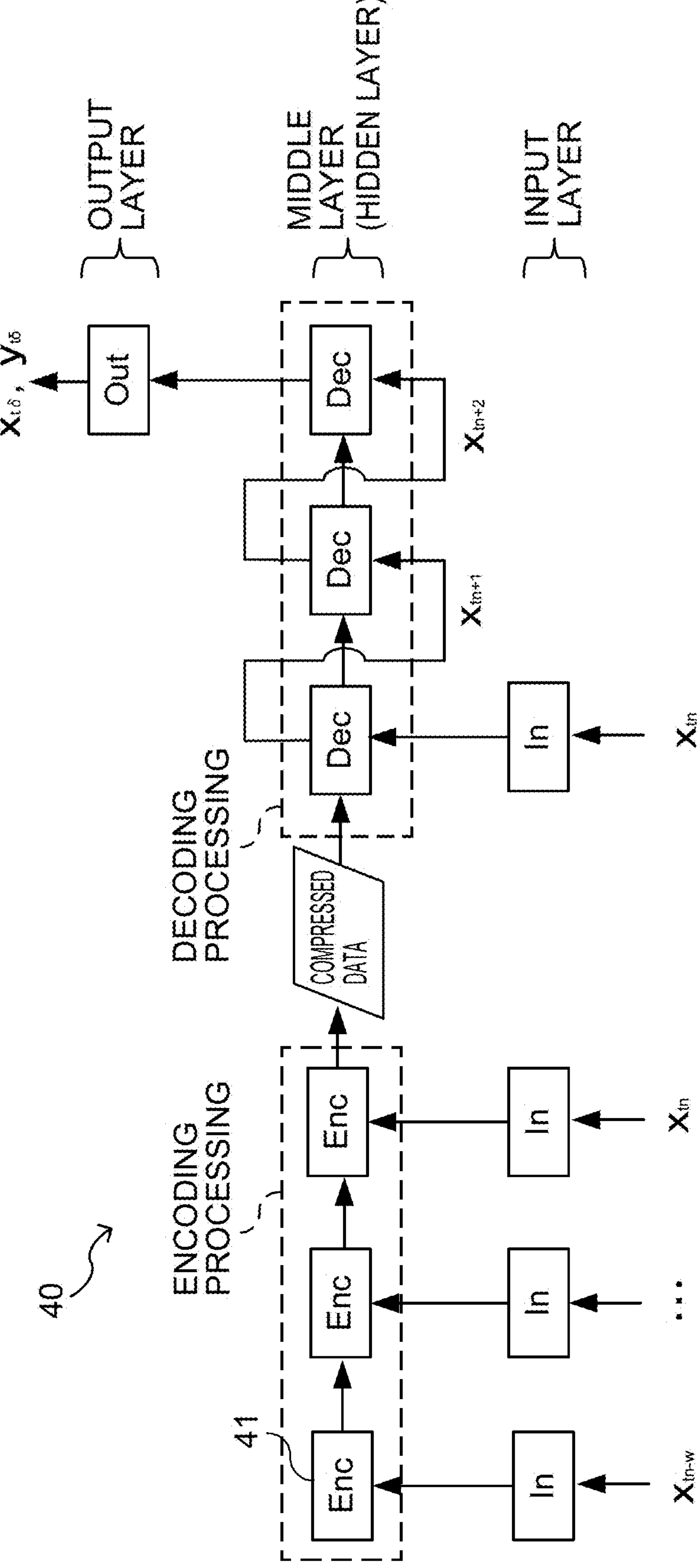
FIG. 3 is a schematic diagram illustrating an example of an encoder/decoder model according to the first exemplary embodiment.

The prediction model 40 is a recurrent neural network (RNN) that employs an encoder/decoder model. The RNN includes an input layer, a middle layer (hidden layer), and an output layer, as illustrated in FIG. 3 for example. Processing is performed in the middle layer by transferring already processed data to a different node 41. Moreover, in the middle layer the encoder/decoder model performs encoding processing to extract a feature from the input data and to compress the extracted feature into a vector of a predetermined dimensionality, and decoding processing to decode the feature contained in compressed data that had been compressed thereby. The prediction model 40 that is an encoder/decoder model uses past contact force in a specific time period to predict a contact force at a specific time, and to predict a determination of a state of the target T, and outputs these predictions.

Figure 4:
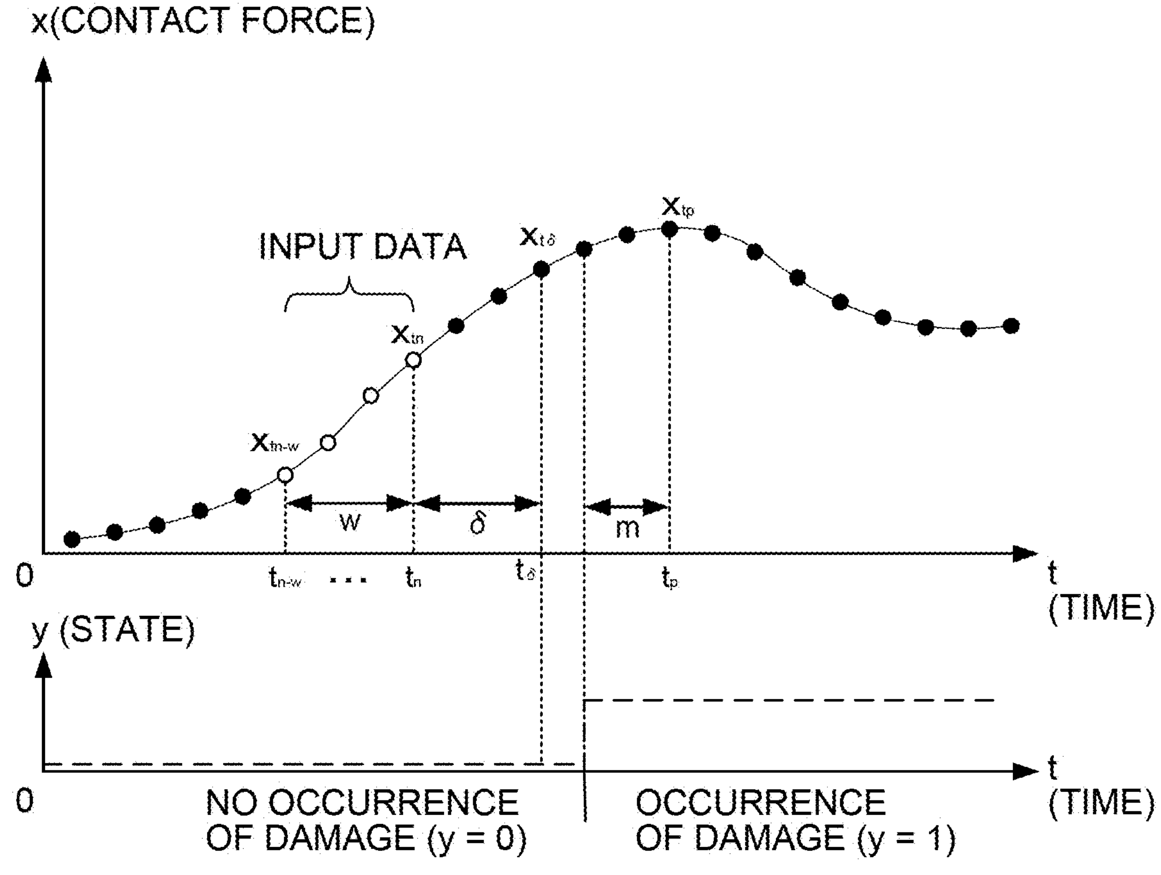
FIG. 4 is a graph illustrating an example of contact force predicted according to the first exemplary embodiment.

For example, as illustrated in FIG. 4, in cases in which the contact force acquired in a time period w up to the current time point $t_n$ have been input as the input data, the prediction model 40 predicts a contact force (hereafter referred to as "predicted contact force") $x_{t\delta}$ and a state of the target T y that would be obtained $\delta$ seconds after the current time point $t_n$. Note that the state of the target T according to the present exemplary embodiment is whether or not damage occurs to the target T. Moreover, in the following description, a time when the predicted contact force $x_{t\delta}$ is obtained at $\delta$ seconds after the current time point $t_n$ is referred to as a "specific time".

Specifically, the prediction model 40 uses the plural contact forces that have been input to predict the contact force received from the target T and identifies a peak value $x_{tp}$ of the contact force. The prediction model 40 identifies a time tp when the identified peak value $x_{tp}$ of the contact force occurs, and sets a range of a predetermined margin m from the identified time tp as a datum point. The prediction model 40 determines that damage occurs in cases in which a specific time to when the predicted contact force $x_{t\delta}$ is obtained is contained within the margin m range from the time tp as a datum point. In other words, the prediction model 40 determines that damage will occur (y=1) at the specific time $t_\delta$ in cases in which a condition as expressed by the following numerical equation has been satisfied, and determines that damage will not occur (y=0) at the specific time $t_\delta$ in cases in which the condition is not satisfied.

$$y = 1, (t_p - m < t_\delta) \tag{1}$$

Note that the margin m according to the present exemplary embodiment has been described for an embodiment in which it is predetermined. However, there is no limitation thereto. The margin m may be set according to the target T. For example, a mass of the target T may be measured and the margin m may be set according to the mass, or a density may be computed from a result obtained from emitting ultrasound at the target T, and the margin m may be set according to the density. Moreover, a size and a substance of the target T may be predicted from an image capturing the target T, and the margin m may be set according to the predicted size and substance. The mass, density, size, and substance of the target T are each an example of a "feature value".

Moreover, in the present exemplary embodiment, plural contact forces are obtained from a single target T due to employing the tactile sensor S1 and the tactile sensor S2 that are distributed tactile sensors. This means that the prediction model 40 predicts the peak value $x_{tp}$ detected first most after the respective contact force has exceeded a threshold in each of the plural contact forces. The prediction model 40 determines the state of the target T using the peak value $x_{tp}$ detected first most from out of the predicted peak values $x_{tp}$ of the plural contact forces.

The prediction unit 34 inputs the contact force in the specific time period acquired by the acquisition unit 31 to the prediction model 40, and performs a determination of the state of the target T (i.e., whether or not damage occurs at the specific time).

In cases in which the prediction unit 34 has determined damage to occur at the specific time, the control unit 35 transmits an instruction to stop the motor M to the motor drive section 21, thereby controlling the gripping force occurring on the target T.

Figure 5:
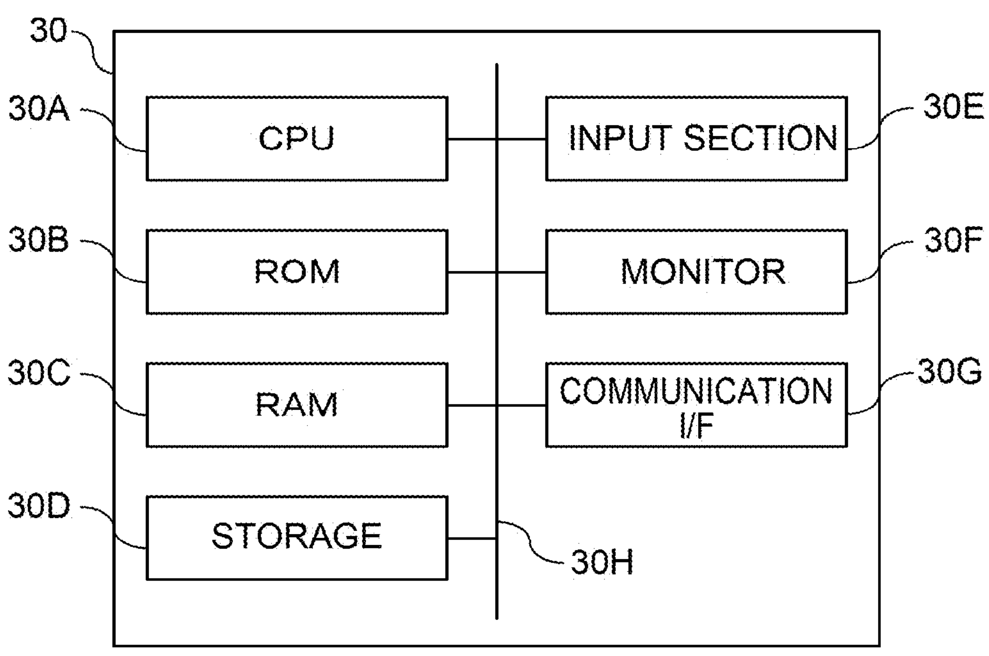
FIG. 5 is a block diagram illustrating an example of a configuration of a control device according to each exemplary embodiment.

Next, description follows regarding a hardware configuration of the control device 30, with reference to FIG. 5. FIG. 5 is a block diagram illustrating a hardware configuration of the control device 30.

As illustrated in FIG. 5, the control device 30 includes a central processing unit (CPU) 30A, read only memory (ROM) 30B, random access memory (RAM) 30C, storage 30D, an input section 30E, a monitor 30F, and a communication interface (I/F) 30G. Each configuration is connected together through a bus 30H so as to be capable of communicating with each other.

In the present exemplary embodiment a control program is stored in the storage 30D. The CPU 30A is a central processing unit that executes various programs and controls each configuration. Namely, the CPU 30A reads a program from the storage 30D, and executes the program using the RAM 30C as a work area. The CPU 30A controls each of the above configurations and performs various computation processing according to the program recorded in the storage 30D.

Various programs and various data are stored on the ROM 30B. The RAM 30C serves as a work area to temporarily store programs or data. The storage 30D is configured by a hard disk drive (HDD) or solid state drive (SSD), and is stored with various programs including an operating system and various data.

The input section 30E includes a keyboard, and a pointing device such as a mouse or the like, and is employed to perform various inputs. The monitor 30F is, for example, a liquid crystal display, and displays various information such as a gripped state of the target T or the like. The monitor 30F may also function as the input section 30E by employing a touch panel therefor.

The communication I/F 30G is an interface for performing communication with external devices, and employs a standard such as, for example, Ethernet®, FDDI, or Wi-Fi®.

Each of the functional configuration of the control device 30 illustrated in FIG. 2 is implemented by the CPU 30A by reading the control program stored on the storage 30D, and loading and executing the control program in the RAM 30C.

Figure 6:
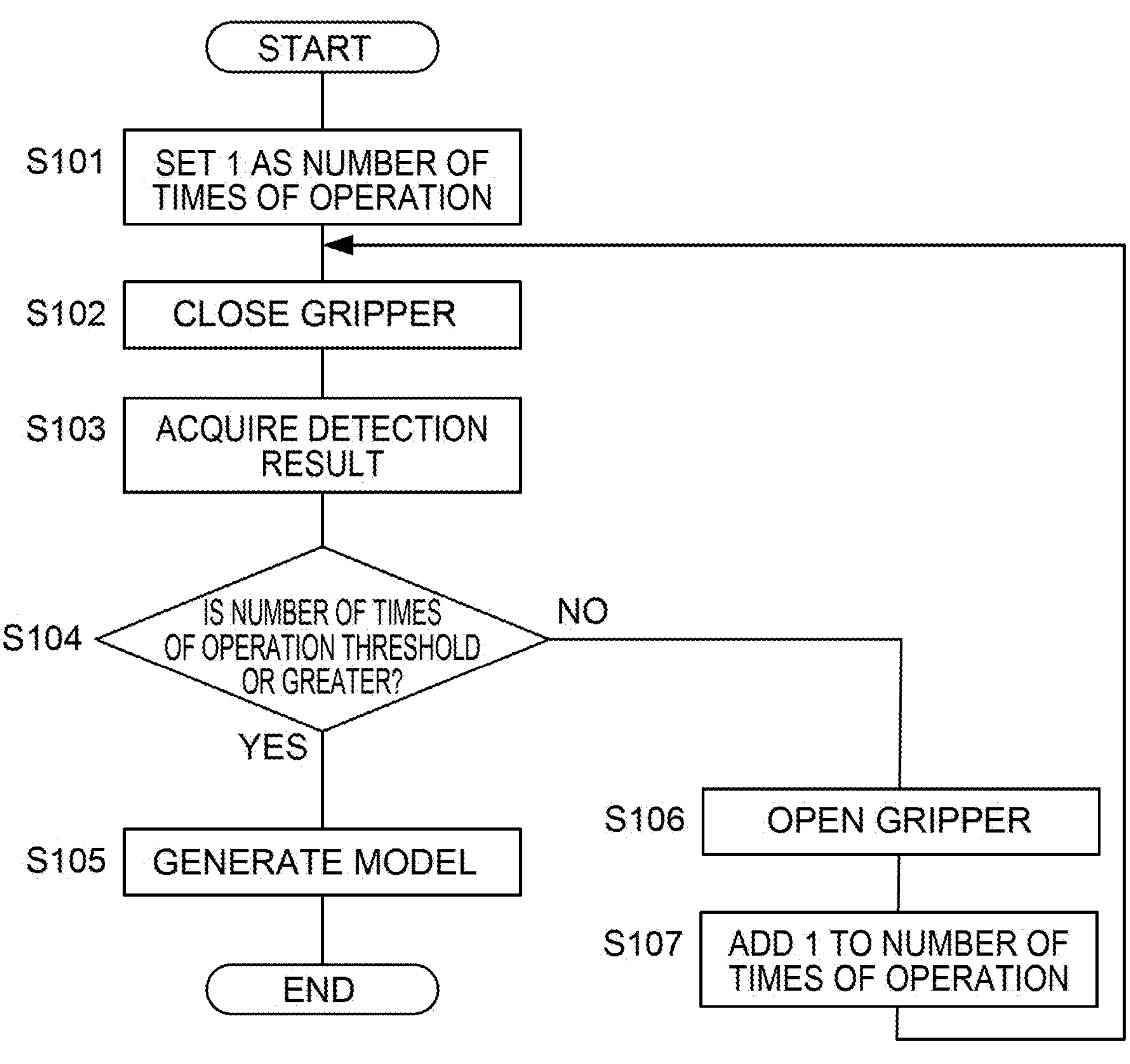
FIG. 6 is a flowchart illustrating a flow of model generation processing according to the first exemplary embodiment.
Figure 7:
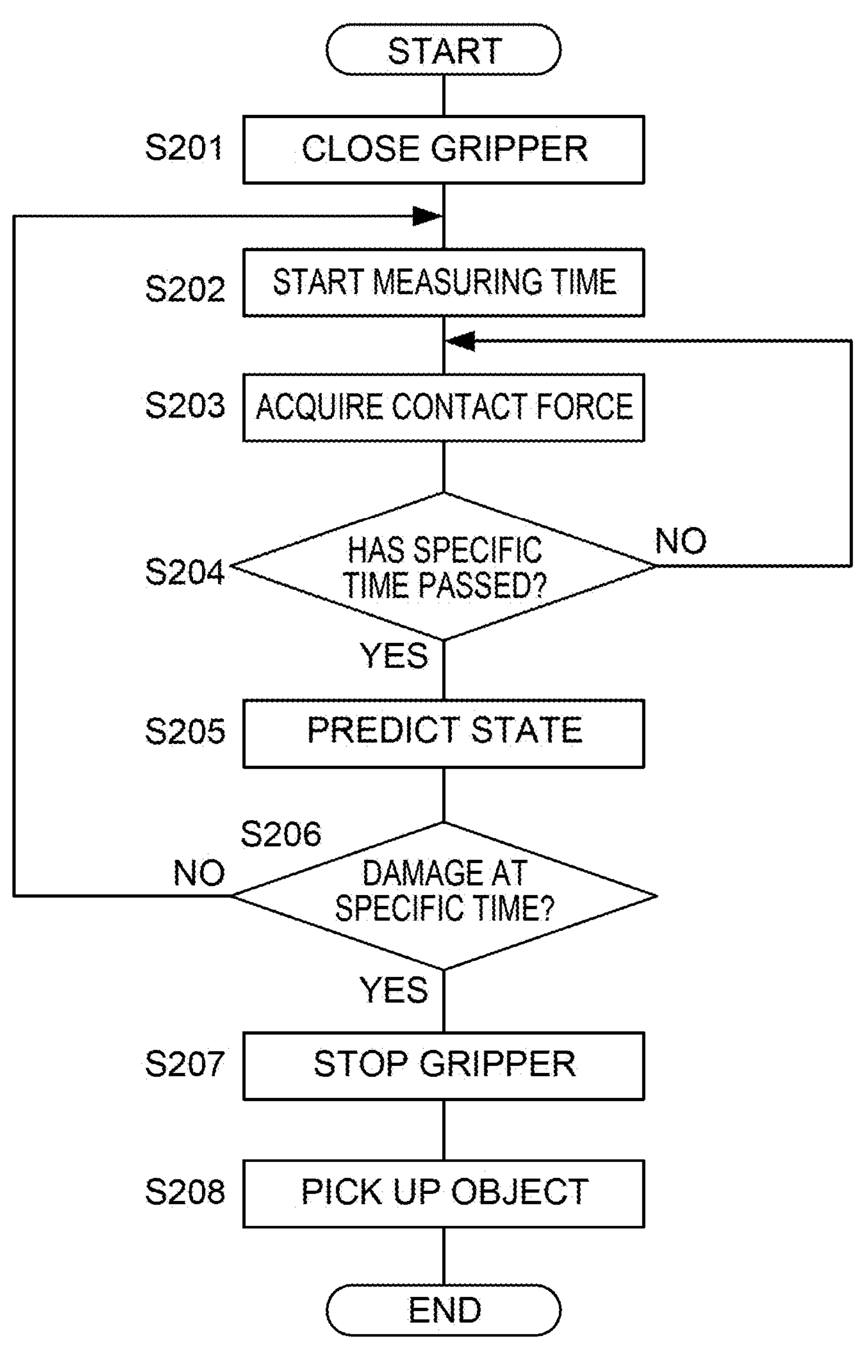
FIG. 7 is a flowchart illustrating a flow of prediction processing according to the first exemplary embodiment.

Next, description follows regarding operation of the control device 30, with reference to FIG. 6 and FIG. 7.

FIG. 6 is a flowchart illustrating a flow of the processing by the control device 30 to generate the prediction model 40. After execution of model generation processing is instructed by a user manipulating the input section 30E, the model generation processing is executed by the CPU 30A reading the control program from the storage 30D, and loading and executing the control program in the RAM 30C.

At step S101, the CPU 30A sets 1 as a number of times of operation. The CPU 30A sets the gripper GR to an open state as an initial state.

At step S102, the CPU 30A transmits an instruction to drive the motor M to the motor drive section 21, thereby closing the gripper GR at a uniform speed.

At step S103, the CPU 30A acquires from the tactile sensors S detection results of contact forces detected when the target T is being damaged, and stores the acquired detection results.

At step S104, the CPU 30A performs determination as to whether or not the number of times of operation is a threshold or greater. The CPU 30A transitions to step S105 in cases in which the number of times of operation is the threshold or greater (step S104: YES). In contrast, the CPU 30A transitions to step S106 in cases in which the number of times of operation is not the threshold or greater (i.e., the number of times of operation is less than the threshold) (i.e., step S104: NO).

At step S105, the CPU 30A uses the stored detection results to execute machine learning and to generate the prediction model 40.

At step S106, the CPU 30A transmits an instruction to drive the motor M to the motor drive section 21, and opens the gripper GR to set the initial state. A new target T is installed instead of the damaged target T.

At step S107, CPU 30A adds 1 to the number of times of operation and transitions to step S102.

Next, description follows regarding control processing performing an action on the target T, see FIG. 7. FIG. 7 is a flowchart illustrating a flow of control processing by the control device 30. After execution of control processing is instructed by a user manipulating the input section 30E, the control processing is executed by the CPU 30A reading the control program from the storage 30D, and loading and executing the control program in the RAM 30C.

At step S201, the CPU 30A transmits an instruction to drive the motor M to the motor drive section 21, sets the open state of the gripper GR as the initial state, and closes the gripper GR at a uniform speed.

At step S202, the CPU 30A initializes a measurement time, and starts measuring time.

At step S203, the CPU 30A acquires from the tactile sensor S the contact force received from the target T.

At step S204, the CPU 30A performs determination as to whether or not the measured time has passed the specific time period. The CPU 30A transitions to step S205 in cases in which the specific time period has passed (step S204: YES). In contrast, the CPU 30A transitions to step S203 in cases in which the specific time period has not passed (the measurement time is less than the specific time period) (step S204: NO), and acquires the contact force.

At step S205, the CPU 30A uses the contact force acquired in the specific time period to predict the state of the target T after the specific time.

At step S206, the CPU 30A performs determination as to whether or not damage occurs at the specific time. The CPU 30A transitions to step S207 in cases in which damage occurs at the specific time (step S206: YES). In contrast, the CPU 30A transitions to step S202 in cases in which damage does not occur at the specific time (step S206: NO), initializes the measurement time, and starts measuring time.

At step S207, the CPU 30A transmits an instruction to stop the motor M to the motor drive section 21, and stops the gripper GR.

At step S208, the CPU 30A transmits an instruction to drive the motor M to the motor drive section 21, and picks up the target T.

As described above, the present exemplary embodiment is able to grip various fragile objects without a specialized soft gripper and without causing damage.

Second Exemplary Embodiment

In the first exemplary embodiment an embodiment has been described of controlling driving of fingers provided to the gripper GR. In the present exemplary embodiment, an embodiment will be described of controlling driving of a robot arm AR provided to a robot.

Note that in the following, a function of a robot system (see FIG. 2), a diagram illustrating an encoder/decoder model (see FIG. 3), a graph illustrating predicted contact force (see FIG. 4), and a configuration of a control device (see FIG. 5) are similar to in the first exemplary embodiment, and so description will accordingly be omitted thereof.

Figure 8:
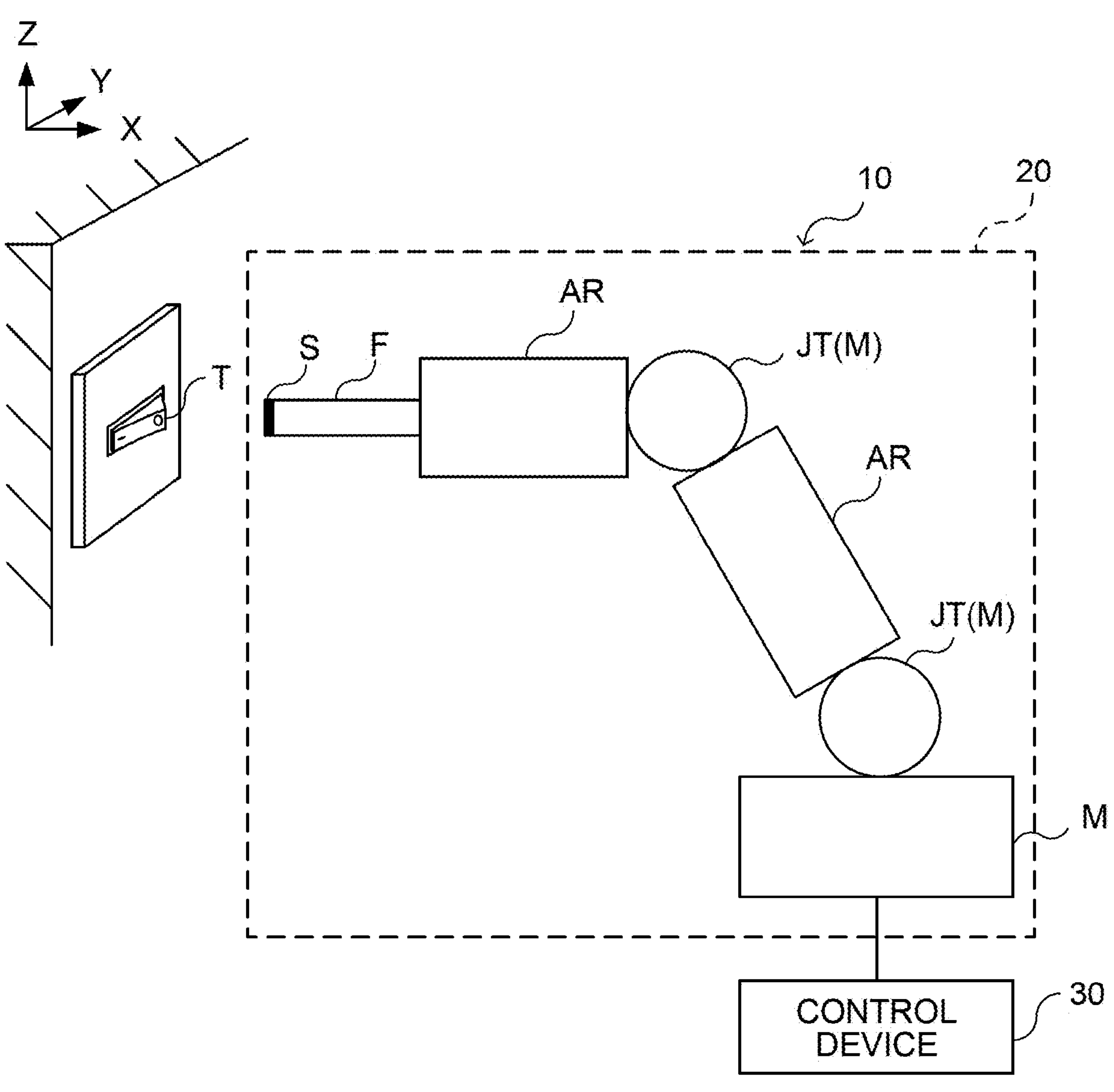
FIG. 8 is a configuration diagram of a robot system according to a second exemplary embodiment.

FIG. 8 is a configuration diagram of a robot system 10 according to a second exemplary embodiment. As illustrated in FIG. 8, the robot system 10 includes a robot 20, and a control device 30. The robot system 10 according to the present exemplary embodiment functions as an input device that presses a target T, such as a switch.

The robot 20 includes a robot arm AR serving as a mechanism part that is a target of motion control when performing a pressing action, and joints JT connected to the robot arm AR.

The robot arm AR includes a single finger F that presses the target T serving as an example of a target object. The joints JT each include a motor M for driving the robot arm AR connected thereto. The motor M is a servomotor for controlling a position, and an orientation, of the robot arm AR by driving. Note that the robot 20 according to the present exemplary embodiment will be described for an embodiment in which the position, and the orientation, of the robot arm AR are controlled by driving the motor M, so as to press the target T in an X axis direction at a uniform speed. However, there is no limitation thereto. The motor M may control extension and contraction of a finger F provided to the robot arm AR, and may control to move and position the robot 20.

Moreover, a tactile sensor S is provided to a contact surface of the finger F. The tactile sensor S detects contact force received from the target T as detected by the tactile sensor S when the finger F has pressed the target T.

Namely, the robot 20 controls the position of the finger F provided to the robot arm AR by driving the motor M provided to each of the joints JT, thereby pressing the target T.

The control device 30 controls driving of the robot arm AR on the robot 20. Specifically, the acquisition unit 31 illustrated in FIG. 2 acquires contact force from the tactile sensor S, and a prediction unit 34 uses the acquired contact force to predict a state of a switch (i.e., whether or not a switch has been switched). The control device 30 controls the robot 20 by a control unit 35 transmitting, to a motor drive section 21, an instruction to stop the motor M according to the prediction result of the prediction unit 34.

Figure 9:
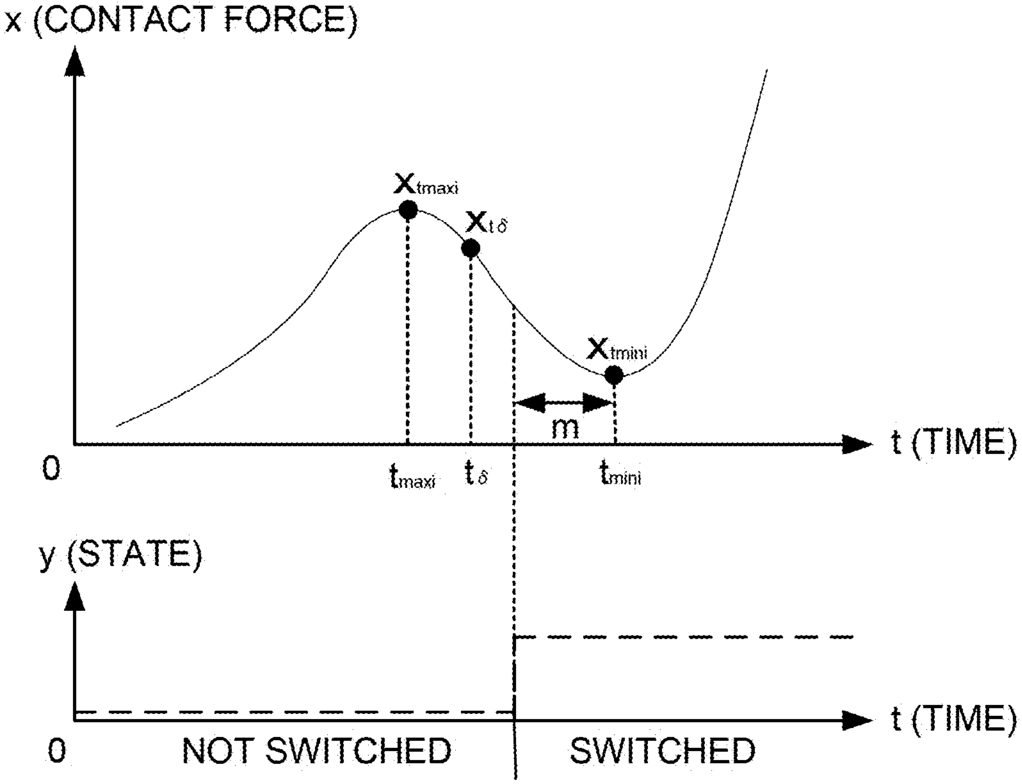
FIG. 9 is a graph illustrating an example of contact force predicted according to the second exemplary embodiment.

As illustrated in the example in FIG. 9, in cases in which the target T, such as a switch, is to be pressed, the contact force received from the target T exhibits a local maximum just before the switch is switched, and at the instance the switch is switched changes to exhibiting a local minimum.

The prediction unit 34 accordingly uses the prediction model 40 to predict a local minimum in the contact force when the switch is switched as a time series feature, and to predict the state of the target T. Specifically, the prediction model 40 identifies a time $t_{mini}$ at which a local minimum value $x_{tmini}$ occurs in the predicted contact force using the acquired contact force, and sets a range of a predetermined margin m from the identified time $t_{mini}$ as a datum point. The prediction model 40 then determines that the switch has been switched when a specific time $t_\delta$ falls within the margin m range from the time $t_{mini}$ as a datum point.

Figure 10:
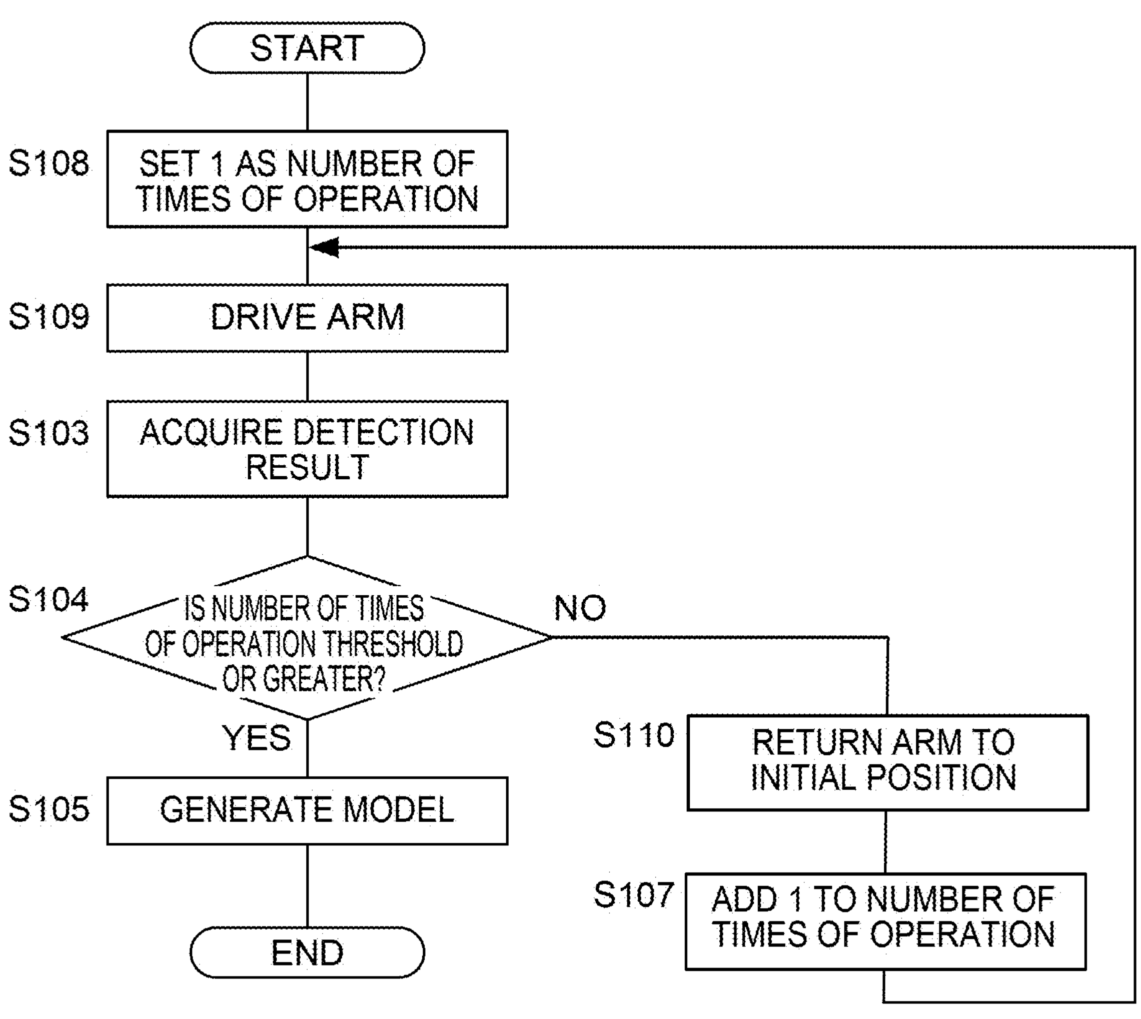
FIG. 10 is a flowchart illustrating a flow of model generation processing according to the second exemplary embodiment.

FIG. 10 is a flowchart illustrating a flow of processing by the control device 30 to generate the prediction model 40. After execution of the model generation processing is instructed by a user manipulating the input section 30E, the CPU 30A reads the control program from the storage 30D, and executes the model generation processing by loading and executing the control program in the RAM 30C. Note that the same reference numerals to in FIG. 6 are appended in FIG. 10 to steps the same as the model generation processing illustrated in FIG. 6, and explanation thereof will be omitted.

At step S108, the CPU 30A sets 1 as a number of times of operation. The CPU 30A then sets the robot arm AR to a state in which the finger F is positioned on a front face of the target T as the initial state.

At step S109, the CPU 30A transmits an instruction to drive the motor M to the motor drive section 21, thereby driving the robot arm AR.

At step S110, the CPU 30A transmits an instruction to drive the motor M to the motor drive section 21, thereby driving the robot arm AR, and sets a position where the finger F is positioned on the front face of the target T as the initial state. The switched target T is thereby set in a state prior to switching.

Figure 11:
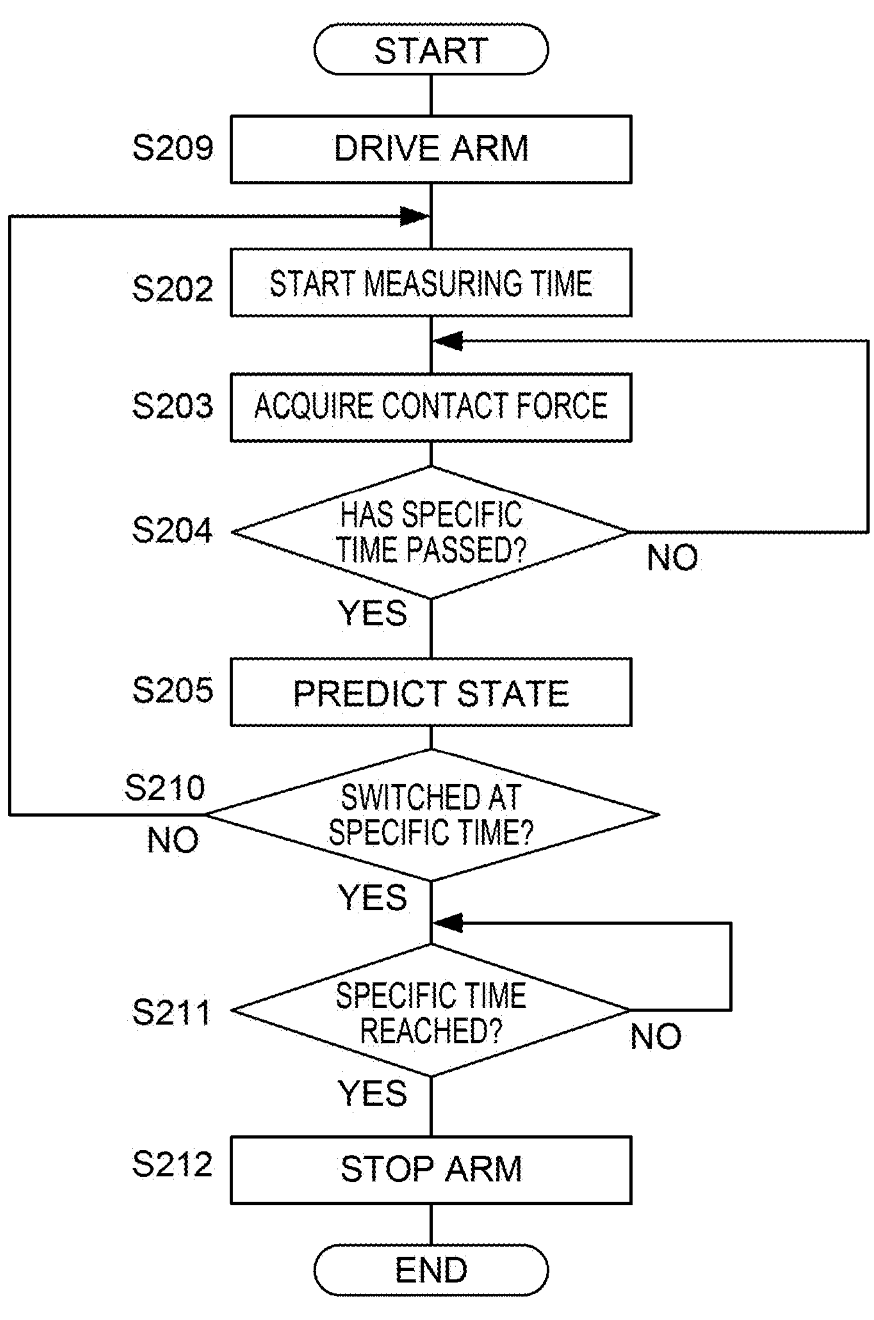
FIG. 11 is a flowchart illustrating a flow of prediction processing according to the second exemplary embodiment.

Next, description follows regarding processing to press the target T, with reference to FIG. 11. FIG. 11 is a flowchart illustrating a flow of processing by the control device 30 to press the target T. After the user has manipulated the input section 30E to instruct pressing processing, the pressing processing is executed by the CPU 30A reading the control program from the storage 30D, and loading and executing the control program in the RAM 30C. Note that the same reference numerals to in FIG. 7 are appended in FIG. 11 to steps that are the same as in the pressing processing illustrated in FIG. 7, and explanation thereof will be omitted.

At step S209, the CPU 30A transmits an instruction to drive the motor M to the motor drive section 21, thereby driving the robot arm AR set in the initial state.

At step S210, the CPU 30A performs determination as to whether or not to the state of the target is switched at the specific time. The CPU 30A transitions to step S211 in cases in which switched at the specific time (step S210: YES). In contrast, the CPU 30A transitions to step S202 in cases in which not switched at the specific time period (step S210: NO), the measurement time is initialized, and measurement of time is started.

At step S211, the CPU 30A performs determination as to whether or not the specific time has been reached. The CPU 30A transitions to step S212 when the specific time has been reached (step S211: YES). In contrast, the CPU 30A stands by until the specific time arrives when the specific time has not been reached (step S211: NO).

At step S212, the CPU 30A transmits an instruction to stop the motor M to the motor drive section 21, thereby stopping the robot arm AR.

As described above, the present exemplary embodiment is able to press various fragile objects (including switches or the like) without a specialized soft gripper and without causing damage.

Third Exemplary Embodiment

In the second exemplary embodiment, an embodiment has been described in which a local minimum of the contact force received from the target T is predicted. In the present exemplary embodiment, an embodiment will be described in which a local maximum of the contact force received from the target T is predicted.

Figure 12:
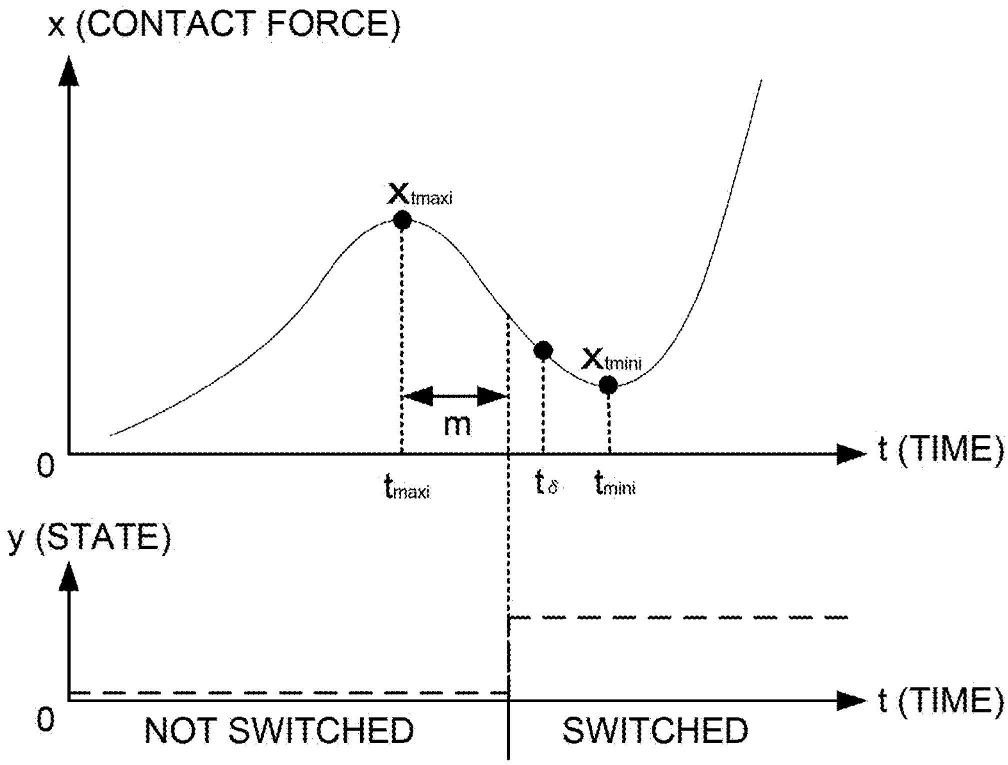
FIG. 12 is a graph illustrating an example of contact force predicted according to a third exemplary embodiment.

The prediction model 40 identifies a time $t_{maxi}$ when the contact force illustrated in FIG. 12 exhibits a local maximum, and sets a range of a predetermined margin m from the identified time $t_{maxi}$ as a datum point. The prediction model 40 determines that the switch has been switched in cases in which a specific time $t_\delta$ has exceeded the range of the predetermined margin m from the identified time $t_{maxi}$ as a datum point.

Fourth Exemplary Embodiment

In the second exemplary embodiment and the third exemplary embodiment, embodiments have been described in which a local minimum, and a local maximum, of the contact force received from the target T are predicted. In the present exemplary embodiment, an embodiment will be described in which a rate of change in contact force received from the target T is predicted.

For example, the prediction model 40 predicts the contact force in a time series, and predicts a time when a rate of change in the contact force (a value of a first-order differential of contact force at time t) becomes 0 as a time series feature. In FIG. 12, the time when the rate of change in contact force becomes 0 indicates a time when the contact force exhibits a local maximum, or a local minimum and, therefore, the prediction model 40 sets a margin m from this time as a datum point, and predicts a state of the target T.

Fifth Exemplary Embodiment

In the fourth exemplary embodiment an embodiment has been described in which a time at which the rate of change in contact force (i.e., the value of the first-order differential of contact force at time t) becomes 0 is predicted. In the present exemplary embodiment, an embodiment will be described in which a time is predicted at which there is an inflection point in the contact force.

For example, the prediction model 40 predicts the contact force in a time series, and predicts a time when there is an inflection point in the contact force (i.e., when a value of a second-order differential of contact force at time t is 0) as a time series feature. In FIG. 12, the time when there is an inflection point in the contact force is positioned between the time when the contact force exhibits a local maximum, and a time when it exhibits a local minimum, and so the prediction model 40 predicts a state of the target T from this time as a datum point. For example, the prediction model 40 determines that the target T has switched when a specific time $t_\delta$ has exceeded this time as a datum point.

Sixth Exemplary Embodiment

In the second exemplary embodiment to the fifth exemplary embodiment, embodiments have been described in which a target T such as a switch is pressed. In the present exemplary embodiment, an embodiment will be described in which a target T such as a touch panel is pressed.

Figure 13:
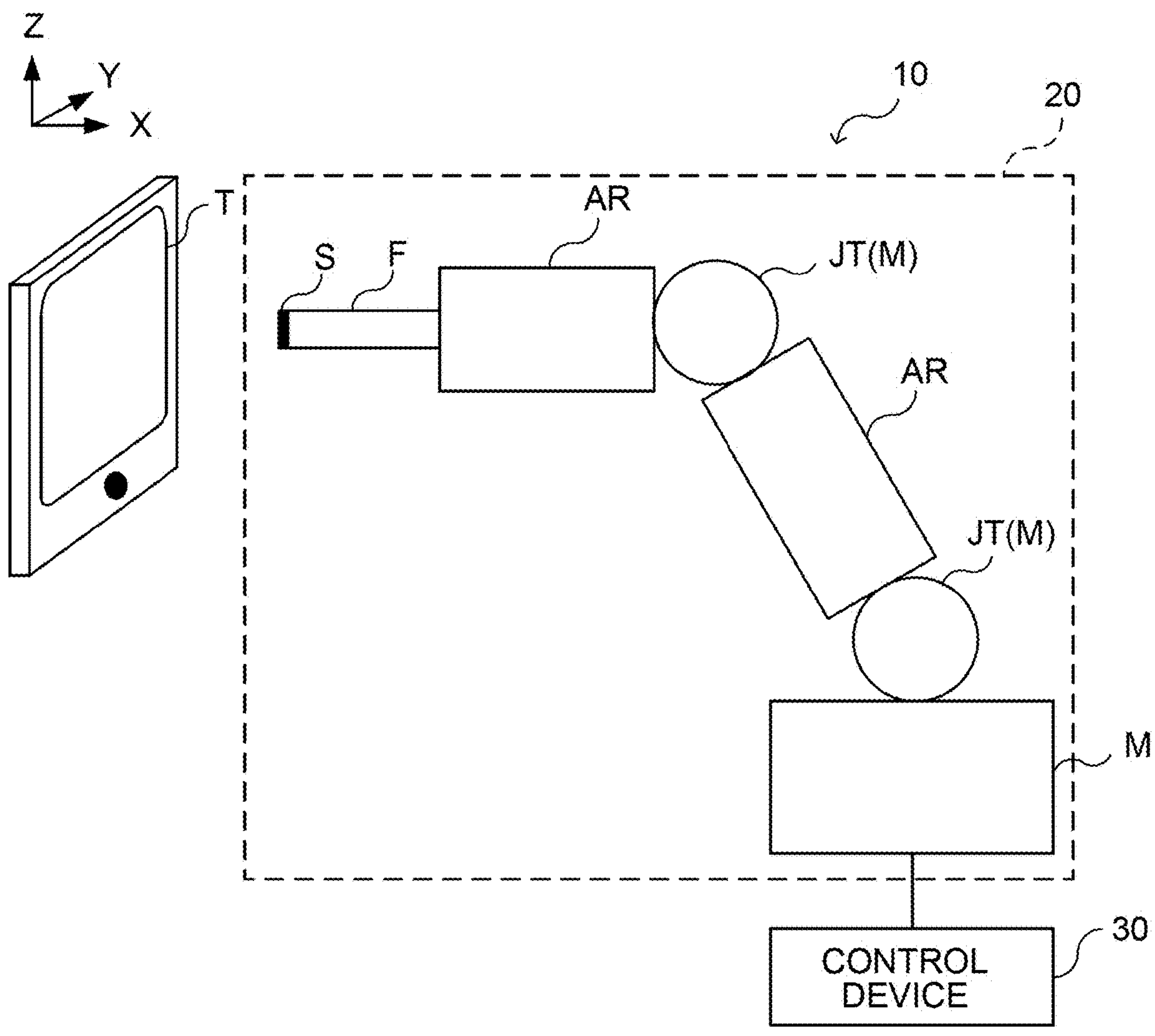
FIG. 13 is a configuration diagram of a robot system according to a sixth exemplary embodiment.

FIG. 13 is a configuration diagram of a robot system 10 according to a sixth exemplary embodiment. As illustrated in FIG. 13, the robot system 10 includes a robot 20, and a control device 30. The robot system 10 functions in the present exemplary embodiment as an input device that presses a target T, such as a touch panel.

Figure 14:
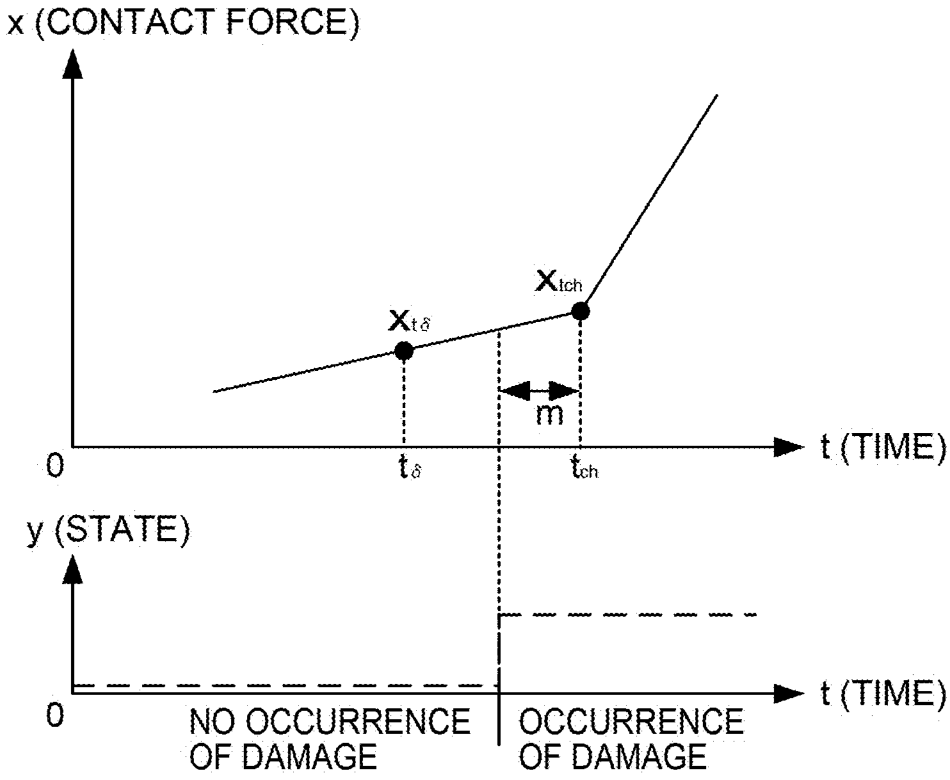
FIG. 14 is a graph illustrating an example of contact force predicted according to the sixth exemplary embodiment.

Detection is performed of flexing of a surface contacted when a target T, such as a touch panel as in the example illustrated in FIG. 13, is pressed, and of the position contacted. As illustrated in the example illustrated in FIG. 14, in cases in which the target T has been pressed, there is a state in which an appropriate load acts on the target T until a limit of flexing is reached. However, if further force is imparted thereto and the target T is pressed beyond this limit of flexing, then the force imparted to the target T increases suddenly. Excessive load is imparted to the target T in cases in which the target T is further pressed beyond the limit of flexing, and damage to the target T may occur.

The prediction model 40 accordingly predicts a change point $x_{tch}$ of the contact force indicating a limit of flexing of the target T as a time series feature, and predicts a state of the target T. Specifically, the prediction model 40 uses the acquired contact force to identify a time $t_{ch}$ at which the change point $x_{tch}$ occurs in the predicted contact force, and sets a range of a predetermined margin m from the identified time $t_{ch}$ as a datum point. The prediction model 40 determines that excessive load is imparted to the target T and damage occurs to the target T in cases in which a specific time to when the predicted contact force $x_{t\delta}$ is obtained is contained in the range of the margin m from the time $t_{ch}$ as a datum point.

Seventh Exemplary Embodiment

In the first exemplary embodiment to the sixth exemplary embodiment, embodiments have been described in which the prediction model 40 is an encoder/decoder model. In the present exemplary embodiment, an embodiment will be described in which the prediction model 40 is an RNN.

Figure 15:
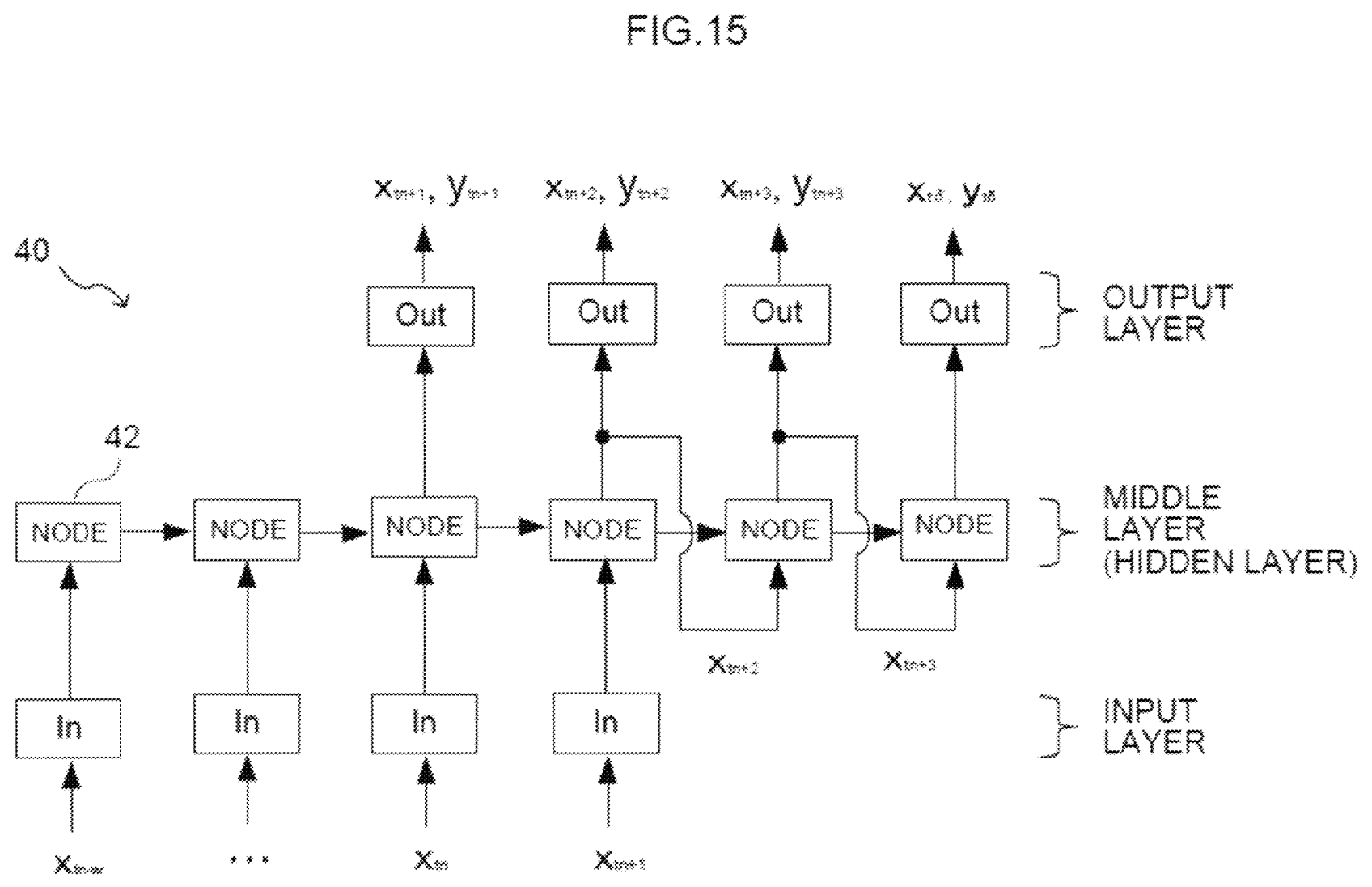

As in the example illustrated in FIG. 15, a middle layer of an RNN performs processing by transferring data processed at one node 42 to another node 42, and uses data input from the input layer and data input from another node 42.

The prediction model 40 according to the present exemplary embodiment uses a contact force input from the input layer, and input data that has been processed in another node 42 (for example, predicted contact force that has been predicted, contact force that has been input in the past, or the like), to predict the predicted contact force for at a next time. A predicted contact force $x_{t\delta}$ is predicted by repeatedly performing such processing at the nodes 42 contained in the middle layer.

By inputting the predicted contact force as predicted by one of the nodes 42 instead of a contact force input from the input layer, the predicted contact force $x_{t\delta}$ can be predicted according to a specific time to a long time period in advance without repeatedly acquiring contact forces.

Note that in the present exemplary embodiment, an example has been described in which the prediction model 40 is an RNN. However, there is no limitation thereto. The prediction model 40 may be multilayer perceptron (neural network), may be a support vector machine, and may be a random forest.

Eighth Exemplary Embodiment

In the first exemplary embodiment to the seventh exemplary embodiment, embodiments have been described in which the prediction model 40 predicts the predicted contact force by a non-parametric method. In the present exemplary embodiment, an embodiment will be described in which the prediction model 40 predicts the predicted contact force using a parametric method.

For example, the prediction model 40 predicts the predicted contact force based on a normal distribution by being trained with detection results detecting the contact force. The prediction model 40 predicts a corresponding normal distribution from the input contact forces, and uses a local maximum value of this normal distribution as a predicted contact force $x_{t\delta}$.

Ninth Exemplary Embodiment

In the first exemplary embodiment to the eighth exemplary embodiment, embodiments have been described in which the prediction model 40 is a model, such as a neural network, on which machine learning has been executed. In the present exemplary embodiment, an embodiment will be described in which the prediction model 40 is a statistically based function.

For example, the prediction model 40 is a function to perform regression analysis. For example, the prediction model 40 derives a regression straight line corresponding to mean square errors in the contact force using plural contact forces that have been input, and predicts the predicted contact force $x_{t\delta}$ according to a specific time to.

Furthermore, other functions that are applicable include regression to a non-linear function, a support vector machine (SVM), Gaussian process regression (GPR), and regression to a polynomial function.

The above exemplary embodiments are merely described to give examples of the configuration of the present disclosure. The present disclosure is not limited to the specific embodiments described above, and various modifications thereto are possible within a range of technology conceivable therefrom.

Note that although the control processing has been executed by a CPU reading software (a program) in each of the above exemplary embodiments, the control processing may be executed by various processors other than a CPU. Examples of such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The control processing may be executed by any one of these various types of processor, or may be executed by a combination of two or more of the same type or different types of processor (such as plural FPGAs, or a combination of a CPU and an FPGA). The hardware structure of these various types of processor is more specifically an electric circuit combining circuit elements such as semiconductor elements.

Moreover, although embodiments have been described for each of the above exemplary embodiments in which the control program is pre-stored (installed) in the storage 30D or the ROM 30B, there is no limitation thereto. The program may be provided in a format recorded on a recording medium such as a compact disk read only memory (CD-ROM), a digital versatile disk read only memory (DVD-ROM), a universal serial bus (USB) memory, or the like. The program may also be provided in a format downloadable from an external device over a network.

The present application claims the benefit of priority of Japanese Patent Application No. 2022-032176 filed on Mar. 2, 2022, the entire content of which is incorporated in the present specification by reference.

The invention claimed is:

1. A control device that is connected to a robot, for controlling a motor of the robot, the robot including an end effector interacting with a target object, the motor for driving the end effector, and a tactile sensor provided at the end effector, and that controls the drive source to perform an action on the target object, the control device comprising:

a memory; and a processor that is coupled to the memory and is configured to:

acquires, using the tactile sensor, a contact force received from the target object at a predetermined time period;

input an acquired contact force to a model, to predicts a time at which a specific effect occurs on the target object, where the model is trained to predict whether or not the specific effect occurs on the target object within a specific time period upon detecting an input contact force; and controls the motor according to a prediction result predicted by the model.

2. The control device of claim 1, wherein the processor is further configured to:

acquire an action result indicating a result of the contact force applied to the target object when the specific effect occurred; and train the model to predict a specific time when the specific effect occurs using the acquired action result, the specific time being within the specific time period.

3. The control device of claim 2, wherein the processor is further configured to:

detect time series features of the contact force from the action result, and train the model to learn a time of a first time series feature that satisfies a first condition among detected time series features as a first time.

4. The control device of claim 3, wherein the first time series feature that satisfies the first condition is a time series feature that is first detected after the contact force exceeds a threshold.

5. The control device of claim 1, wherein the model uses the input contact force to predict a time series feature of the contact force and a predicted contact force at a specific time within the specific time period, and predicts that the specific effect occurs at the specific time in a case in which the specific time related to the predicted contact force corresponds to a time of the time series feature of the contact force.

6. The control device of claim 5, wherein the model sets a range from a time of the time series feature of the contact force as a datum point, and predicts that the specific effect occurs in a case in which the specific time related to the predicted contact force falls within the range.

7. The control device of claim 6, wherein the processor is further configured to:

acquire a feature value indicating a feature of the target object; and cause the model to set the range according to the acquired feature value.

8. The control device of claim 1, wherein a plurality of tactile sensors is provided at the end effector, and the processor is further configured to use the plurality of the tactile sensors to acquire a plurality of contact forces.

9. The control device of claim 8, wherein the model predicts respective time series features of the contact force from each of the plurality of contact forces, and among the predicted time series features of the contact forces, uses a second time series feature that satisfies a second condition to predict a time at which the specific effect occurs.

10. The control device of claim 9, wherein the second time series feature that satisfies the second condition is a time series feature that is first detected after the contact force exceeds a threshold.

11. The control device of claim 1, wherein the processor is further configured to stop driving the motor in a case in which the specific effect has been predicted to occur at a specific time, the specific time being within the specific time period.

12. A control method for a control device that is connected to a robot for controlling s motor of the robot, the robot including an end effector acting on a target object, the motor for driving the end effector, and a tactile sensor provided at the end effector, the control method comprising:

acquiring, by the tactile sensor, a contact force received from the target object at each of a predetermined time period;

preparing a model that is trained to predict whether or not a specific effect occurs on the target object at a specific time period upon detecting an input contact force of the target object;

predicting a time at which the specific effect occurs on the target object upon acquiring the contact force by inputting the acquired contact force to the model; and controlling the motor according to a prediction result.

13. The control method of claim 12, further comprising:

acquiring an action result indicating a result of the contact force applied to the target object at which the specific effect occurred; and training the model using the acquired action result to predict a specific time at which the specific effect occurs, the specific time being within the specific time period.

14. The control method of claim 13, further comprising:

detecting time series features of the contact force from the action result; and training the model to learn a time of a time series feature that satisfies a first condition from among detected time series features as the specific time.

15. The control method of claim 14, wherein the time series feature that satisfies the first condition is a time series feature that is first detected after the contact force exceeds a threshold.

16. A non-transitory storage medium storing a program that causes a computer to execute a control processing offer a control device connected to a robot for controlling a motor, the robot including an end effector interacting with a target object, the motor for driving the end effector, and a tactile sensor provided at the end effector, the control processing comprising:

acquiring, by using the tactile sensor, a contact force received from the target object at each of a predetermined time periods;

preparing a model that is trained to predict whether or not a specific effect occurs on the target object at a specific time period upon detecting an input contact force of the target object;

predicting a time at which the specific effect occurs on the target object upon acquiring the contact force by inputting the acquired contact force to the model; and controlling the motor according to a prediction result.

17. The non-transitory storage medium of claim 16, further comprising:

acquiring an action result indicating a result of the contact force applied to the target object at which the specific effect occurred; and training the model using the acquired action result to predict a specific time at which the specific effect occurs, the specific time being within the specific time period.

18. The non-transitory storage medium of claim 17, further comprising:

detecting time series features of the contact force from the action result; and training the model to learn a time of a time series feature that satisfies a first condition from among detected time series features as the specific time.

19. The non-transitory storage medium of claim 18, wherein the time series feature that satisfies the first condition is a time series feature that is first detected after the contact force exceeds a threshold.

* * * * *